US012785531B2

(12) United States Patent
Bode

(10) Patent No.: US 12,785,531 B2
(45) Date of Patent: Nov. 3, 2026

(54) BLADELESS UNDERWATER ELECTRICITY GENERATOR

(71) Applicant: Roberto Manuel-German Bode, Evanston, IL (US)

(72) Inventor: Roberto Manuel-German Bode, Evanston, IL (US)

( * ) Notice: Subject to any disclaimer, the term of this patent is extended or adjusted under 35 U.S.C. 154(b) by 605 days.

(21) Appl. No.: 18/102,718

(22) Filed: Jan. 29, 2023

(65) Prior Publication Data

US 2023/0246535 A1 Aug. 3, 2023

Related U.S. Application Data

(60) Provisional application No. 63/304,690, filed on Jan. 30, 2022.

(51) Int. Cl.

| | |
|---|---|
| ***H02K 44/08*** | (2006.01) |
| ***F03B 13/10*** | (2006.01) |
| ***F03B 13/12*** | (2006.01) |

(52) U.S. Cl.
CPC ........... *H02K 44/085* (2013.01); *F03B 13/10* (2013.01); *F03B 13/12* (2013.01)

(58) Field of Classification Search
CPC ................................. F03B 13/10; F03B 13/12
See application file for complete search history.

(56) References Cited

U.S. PATENT DOCUMENTS

| | | | | |
|---|---|---|---|---|
| 6,783,687 | B2 | 8/2004 | Richard | |
| 2010/0176596 | A1* | 7/2010 | Peralta ................. | H02K 44/085 310/11 |
| 2011/0129358 | A1* | 6/2011 | Jennings ............... | E21B 21/001 417/50 |
| 2012/0230021 | A1* | 9/2012 | Lynch ....................... | F03D 5/00 362/183 |
| 2019/0372448 | A1* | 12/2019 | Kerr ....................... | H02K 44/08 |
| 2021/0175789 | A1* | 6/2021 | Hong ...................... | C01B 32/90 |

* cited by examiner

*Primary Examiner* — Christopher M Koehler
*Assistant Examiner* — Riley Owen Stout

(57) ABSTRACT

The present invention is a Bladeless Underwater Electricity Generator which can generate a current or voltage from the movement saltwater through the bladeless generator. The bladeless generator utilizes a stream of ions within a magnetic field to separate ions by the Lorentz force. The Ions then contact electrodes where electrons are released or absorbed based on whether the fluid near the electrode is negative or positively charged. The bladeless generator also has a hydrofoil system which can adjust the velocity of the fluid through the magnetic field of the bladeless generator. The ability to adjust the speed of the fluid velocity through the magnetic field increases or decreases the Lorentz force exerting on ions in the saltwater stream.

21 Claims, 10 Drawing Sheets

Fig. 16
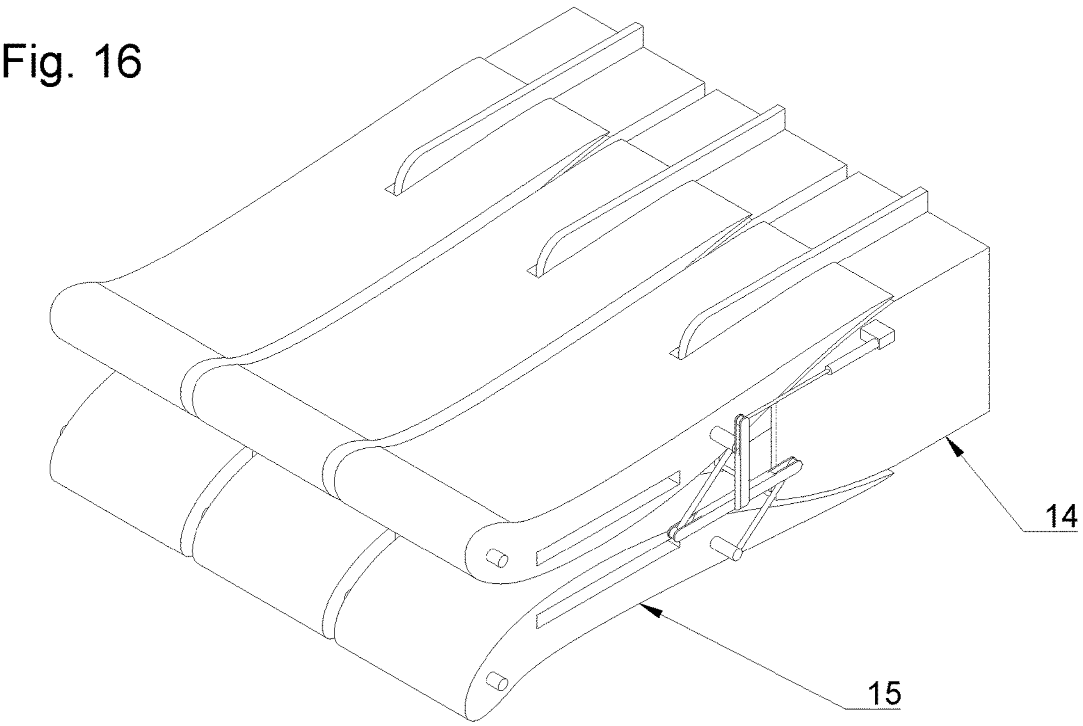
Fig. 17
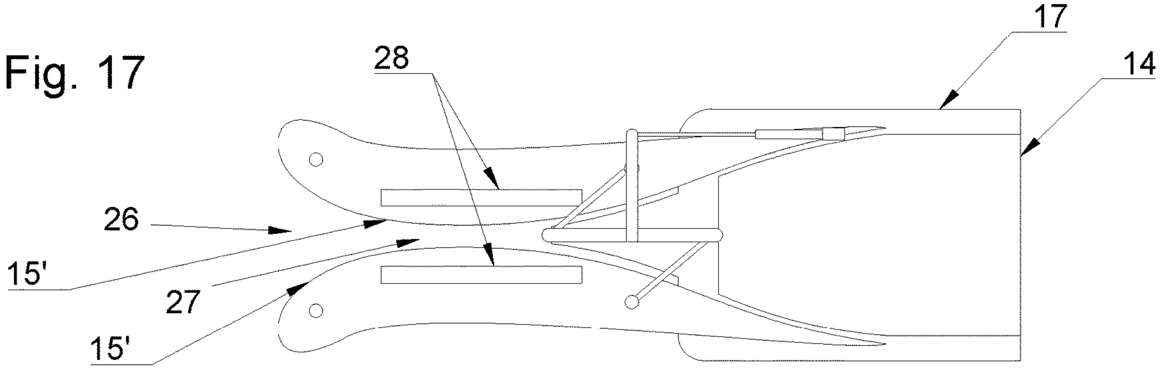
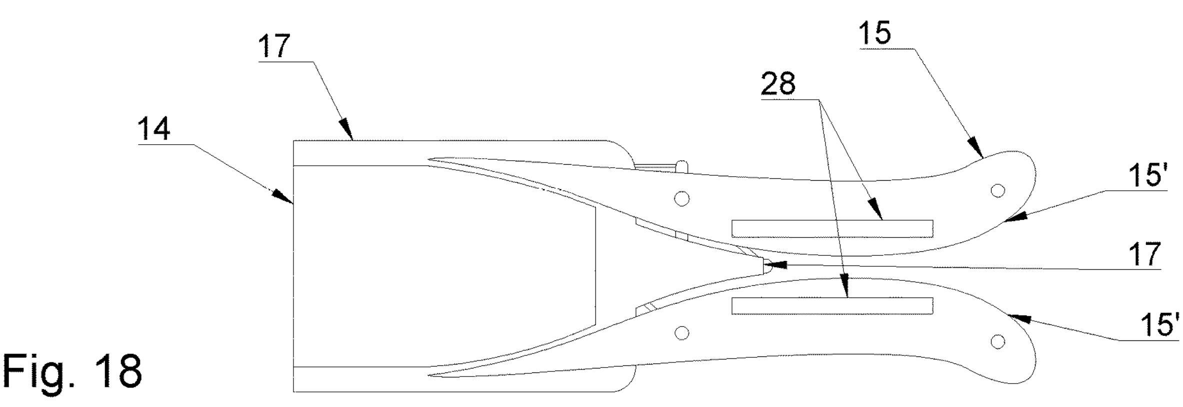
Fig. 18

BLADELESS UNDERWATER ELECTRICITY GENERATOR

CROSS REFERENCE TO RELATED APPLICATION

This application claims the benefit of priority to U.S. Provisional Application Ser. No. 63/304690 filed Feb. 28, 2022, the entire contents of which is being incorporated herein by reference.

FIELD OF INVENTION

The present disclosure pertains to the field of energy generation and power systems, and more specifically to tidal/ocean energy generators.

BACKGROUND OF THE INVENTION AND DESCRIPTION OF RELATED ART

The world is facing difficult choices everyday with regard to which green technologies should be implemented to reduce the carbon footprint of power generation technologies such as natural gas and coal, balanced against new geographic footprint of replacements. However, any choice made can have its own new negative consequences, and thus careful adaption and assessment of new impacts must be made. One of the main green technologies gaining considerable momentum is wind power or wind turbines. Wind turbines generate power by having moving air cause large rotor blades to turn, which turns a generator. To improve power generation capacity and efficiency, these wind turbines are being constructed in larger sizes and in high wind locations. The placement of wind turbines has also expanded to water installations a distance away from coastlines. Some of the negative characteristics of wind turbines include, intermittent power generation, aesthetic appearances and maintenance costs. What is needed is a system of power generation that has relatively constant generation characteristics, does not obscure the visual landscape, and offers generally convenient, inexpensive, and easy to maintain components.

One possibility is to install these wind turbines underwater and utilize ocean currents to turn the rotor. This type of implementation would avoid the negative aspect of the above the surface turbines as they are not readily observable. But even this implementation raises other issues such as different maintenance costs, and placement as well as danger to sea life. Larger turbines will need to be placed far out at sea to have suitable depths, raising transmission and placement limits. To overcome the placement issues, the turbine could be reduced in size and increased in numbers. However, increased numbers of turbines will likely lead to more area usage. Lastly, tidal systems which are related to the motion of water fulfill a number of needed aspects that underwater turbines would not, but even most tidal systems fail to overcome marine fouling or biofouling which is present in all water based energy generation systems.

Marine fouling occurs when ocean organisms attach to surfaces of objects, leading to damage of the surface. This damage not only causes structural damage, but in shipping marine fouling can lead to significant efficiency losses. Furthermore, the tolerances of connections can be moved out of spec and in some situations halted. Marine fouling would likely become a large portion of any maintenance to underwater turbines as the slow speed of rotors would create ideal filter feeding organism attach points, leading to decreased efficiency as well as damage. Several anti-fouling materials and coatings have been developed but these often have other toxic environmental effects. What is needed is a system of generating electrical power from underwater currents, which does not have exposed moving blades or other components.

The present invention avoids the issues present in underwater and tidal systems by not having any dependence on moving parts to generate electricity. The present invention further offers significant scalability for increased depth of application.

SUMMARY OF THE INVENTION

The present invention is a Bladeless Underwater Electricity Generator also referred to in this description as a bladeless generator for brevity, with the ability to generate voltages and electrical currents from a passing fluid, and more specifically a saltwater current present in oceans and seas. The fluid flow through the bladeless generator can be created from ocean currents, tidal flows, streams, ocean upwelling and downwelling, or can even attained by towing the bladeless generator from a source of motion such as a boat. When the flow of the fluid passes through the bladeless generator, ions present in the fluid undergo differentiated separation through interactions between the charge and a substantially uniform magnetic field and are separated into two streams based on charge sign. Fluid velocity maintenance is provided by mutually opposed adjustable hydrofoils capable of increasing or decreasing fluid velocity in the separation zone based on the attack angle. After fluid separation, electrodes are able to take up or release charges into the fluid based on the accumulated presence of charges in the separated streams generating a current and voltage.

Fluids usable in the current device must contain ions because a charge is necessary to interact with the provided B (magnetic) field. The interaction is generally explained by the Lorentz force for individual charges such as those found in saltwater. The Lorentz force equation demonstrates that a charge having either positive or negative a signs, will experience a force on it described by the cross product of the velocity of the charge and the B field strength.

Lorentz equation: $F=qv\times B$

F=Lorentz force
q=charge
v=velocity of charge q
B=strength of magnetic field

Therefore, as an ion in a fluid flows into an intake of the bladeless generator its velocity will carry it across a magnetic field where the ion will experience a force accelerating the charge in one of two directions based on the charge sign. The acceleration will cause a net positive charge build up towards one side of the fluid flow, and the opposite charge on the other side in the fluid flow while the ions travel through the magnetic field present in a separation zone.

Maintaining a specified fluid velocity is important to efficient power generation, and is maintained through several different methods including raising or lowering the bladeless generator position in a current stream, changing its direction or orientation. Additionally, two hydrofoils or more generally identified as foils, are present on the top and bottom of the intake allowing for controlled velocity of the fluid based on the attack angle. In a similar manner to airfoils for gases, the current hydrofoils cause an increased velocity of the fluid over the upper surface of the foil increasing the force exerted on the ions by the Lorentz force. Within each foil are the magnets arranged in manner to create a substantially uniform magnetic field between the foils. As the fluid or saltwater flows between the foils and magnets, its velocity is increased due to the flow over the upper surface of the foil, increasing the Lorentz force on the individual charges, which thereafter increases the concentration of ions in electrode carrying sub-streams, generating a voltage and current between the separate sub-streams through the electrodes. If the fluid flow entering the bladeless generator reduces, the foils can increase the angle of attack increasing the velocity of the separation zone stream, or can reduce the angle of attack based on control signals from a controller. Descriptions below such as "into the page" are used to indicate a direction perpendicular and toward the drawing or figure, and "out of the page" is used to indicate a direction perpendicular and away from the drawing or figure.

BREIEF DESCRIPTION OF THE DRAWINGS

Figure 7:
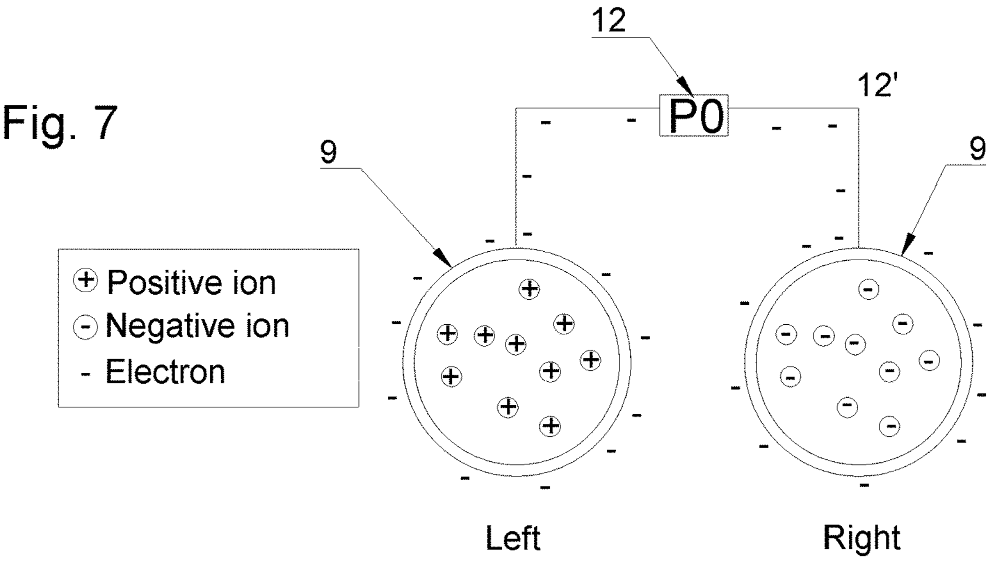
FIG. 7 is a functional diagram of ions within the streams in a first state as they flow through the cylindrical electrodes as well as the electrical connection between the electrodes. This view is seen from the front of FIG. 4 with only function of the cylindrical electrodes portion visible.
Figure 8:
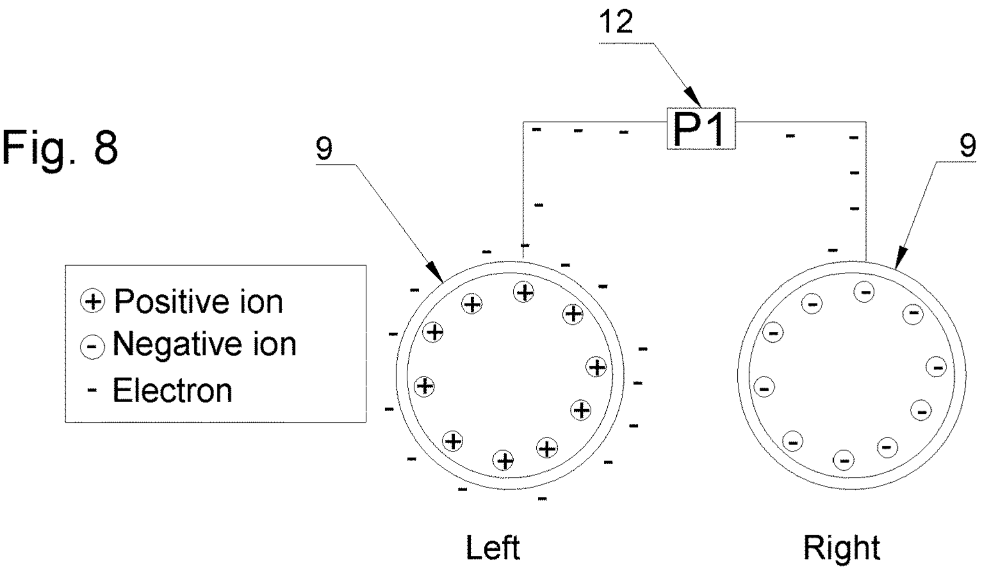

FIG. 8 is a similar functional diagram of FIG. 7 in a second state sequentially after the first where similar charges are redistributing along the cylindrical electrodes to maximize distance between the charges based on repulsive electrostatic forces. Also present in this figure is the motion of charges present in the electrical connection to bias toward the positive stream. Some uptake or release of electrons may be present at this stage of the invention.

Figure 9:
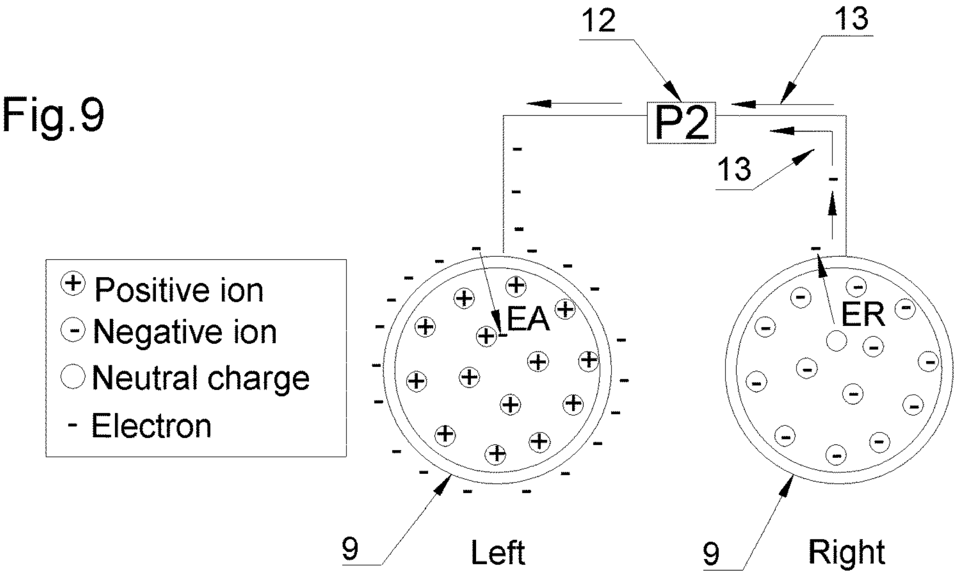

FIG. 9 is a similar functional diagram of FIG. 7 in a third state sequentially after the second, where more similar charges are continuing to flow through the stream causing the uptake or release of electrons through the electrodes.

Figure 10:
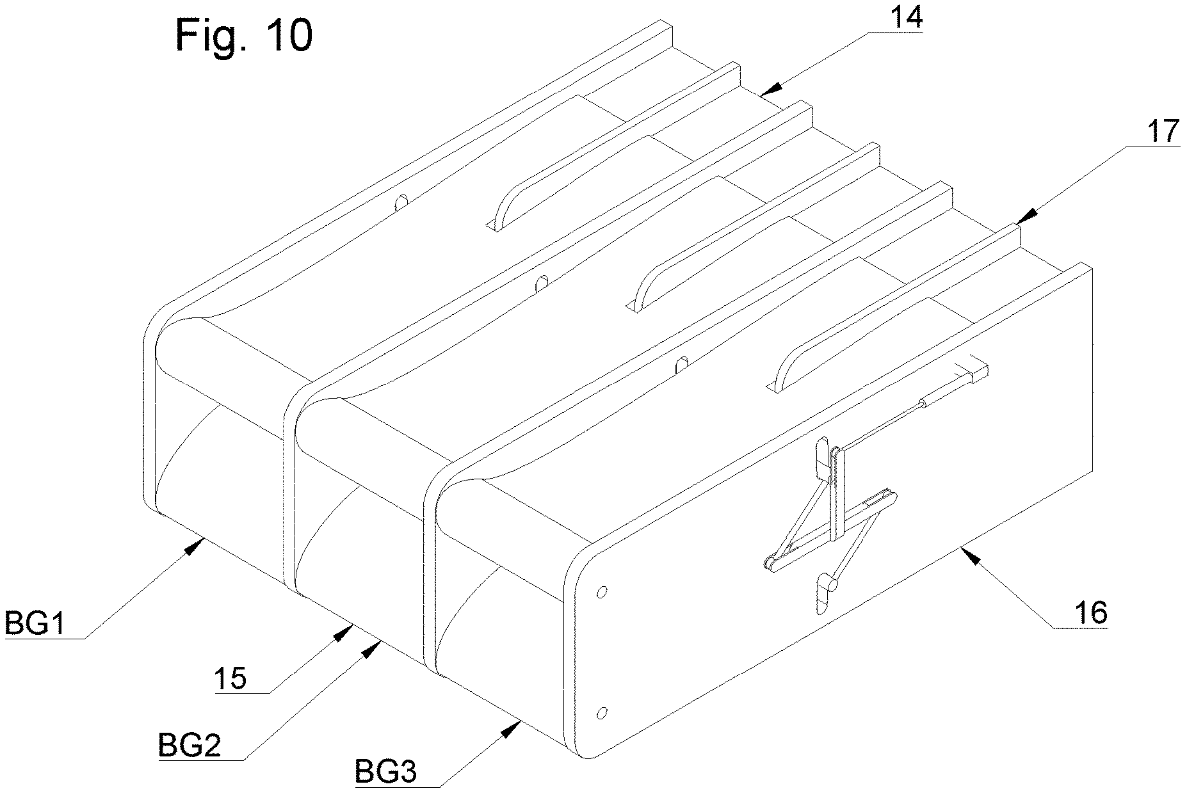

FIG. 10 is a perspective drawing of the present invention in a preferred embodiment having dual hydrofoils and three bladeless underwater energy generators. This view also has one possible implementation of the foil angle control system.

Figure 11:
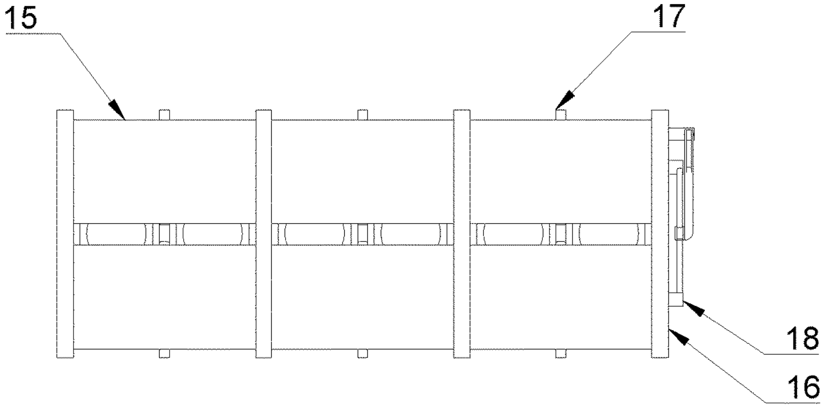

FIG. 11 is front view of the bladeless generator of FIG. 10.

Figure 12:
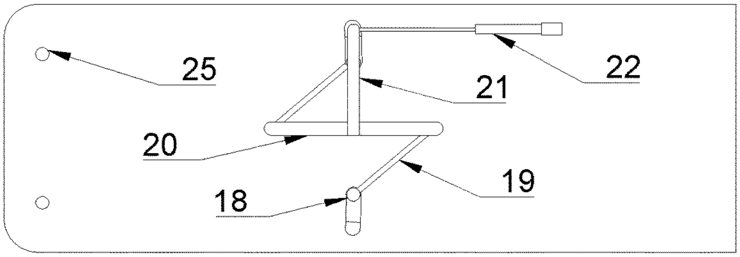

FIG. 12 is a side view of the bladeless generator of FIG. 10 with components of the foil angle control system identified.

Figure 13:
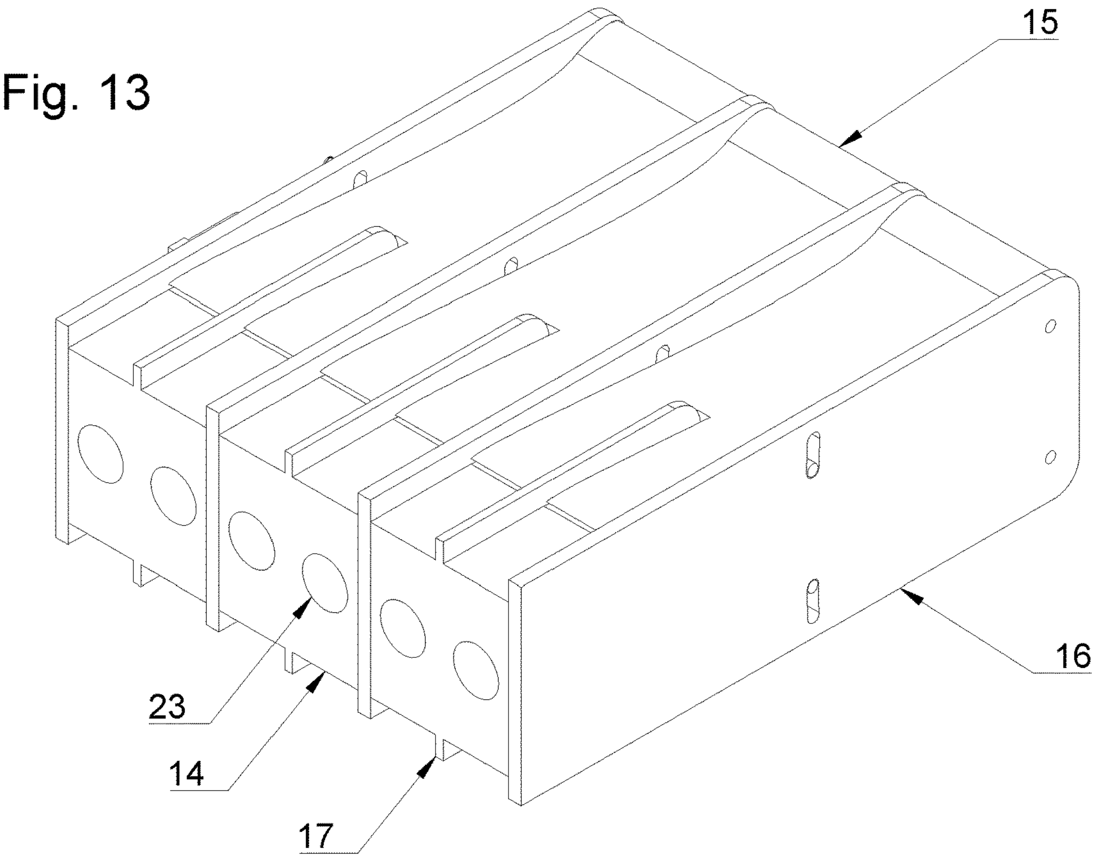

FIG. 13 is a perspective view of the rear of the bladeless generator of the preferred embodiment showing the separated stream exhausts openings.

Figure 14:
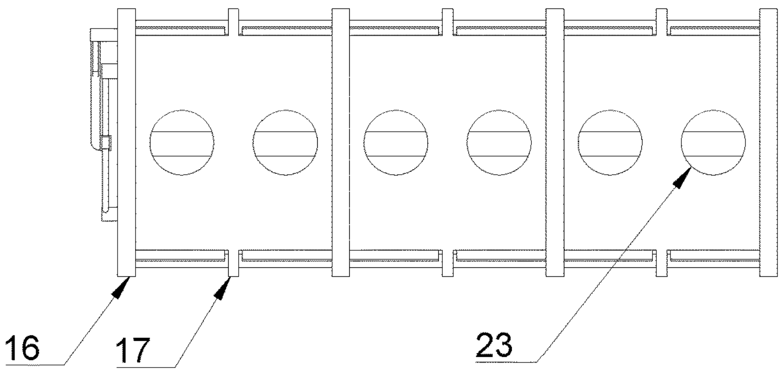

FIG. 14 is a rear view of the bladeless generator.

Figure 15:
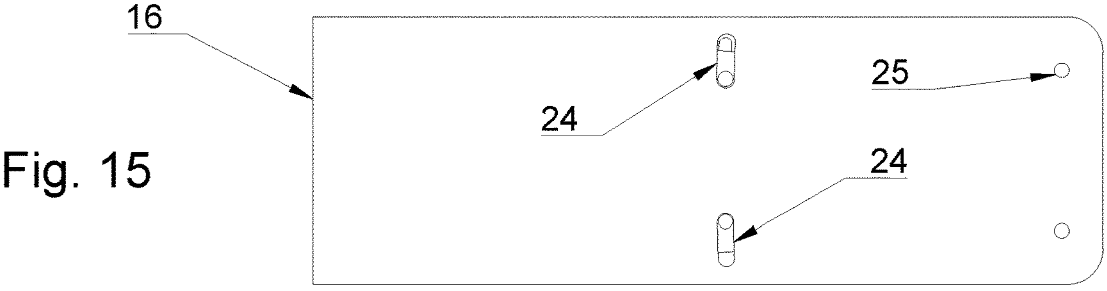

FIG. 15 is a side view of the bladeless generator opposite the side shown in FIG. 12.

FIG. 16 is a perspective view similar to the view shown in FIG. 10 having the dividers between each of the bladeless generator removed for viewing of the interior separation zones, electrode housings and separated stream zones.

FIG. 17 is a side view similar to FIG. 12 showing the foil angle control system and interiors of separation zones as well as the magnet cavities within the foils.

FIG. 18 is another side view of the bladeless generator of the preferred embodiment.

Figure 19:
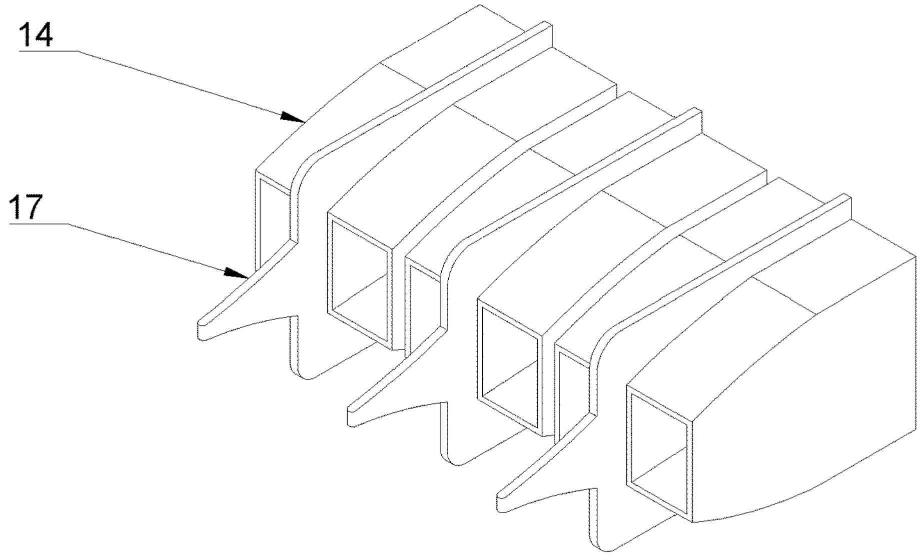

FIG. 19 is a perspective view of the electrode housing having stream dividers but all other components are removed.

Figure 20:
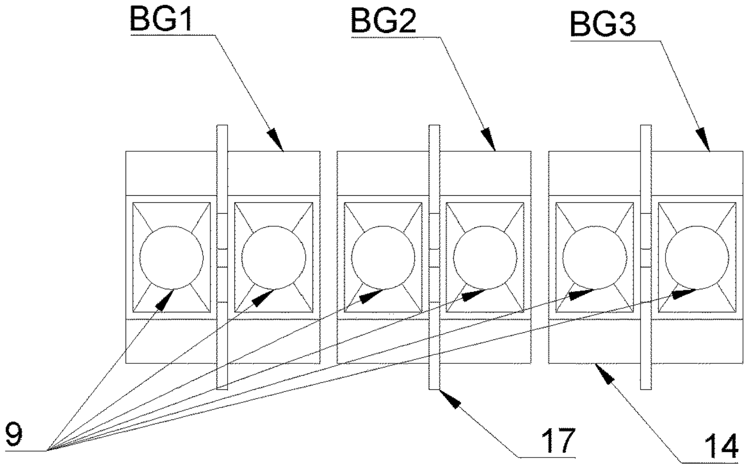

FIG. 20 is a front view of the electrode housings of FIG. 19 showing individual stream pathways through the electrode housing.

Figure 21:
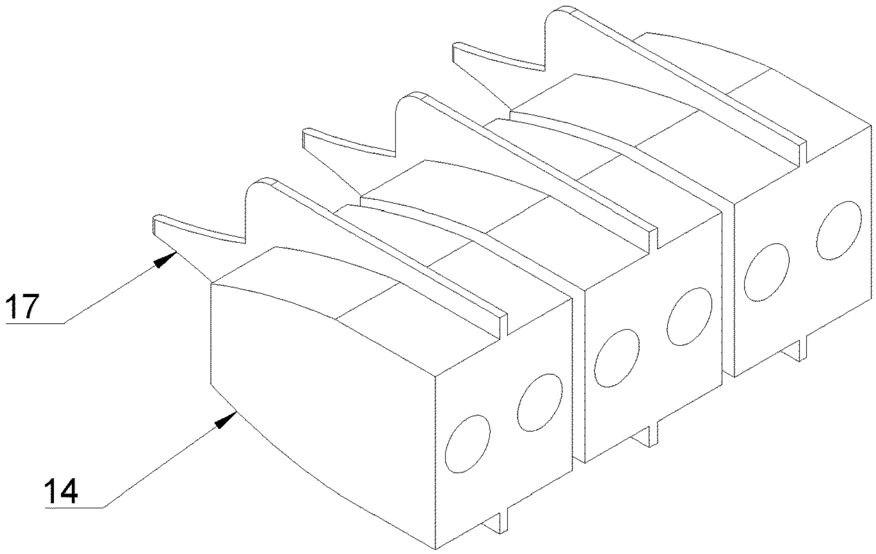

FIG. 21 is another perspective view of the embodiment shown in FIG. 19 from the rear.

Figure 22:
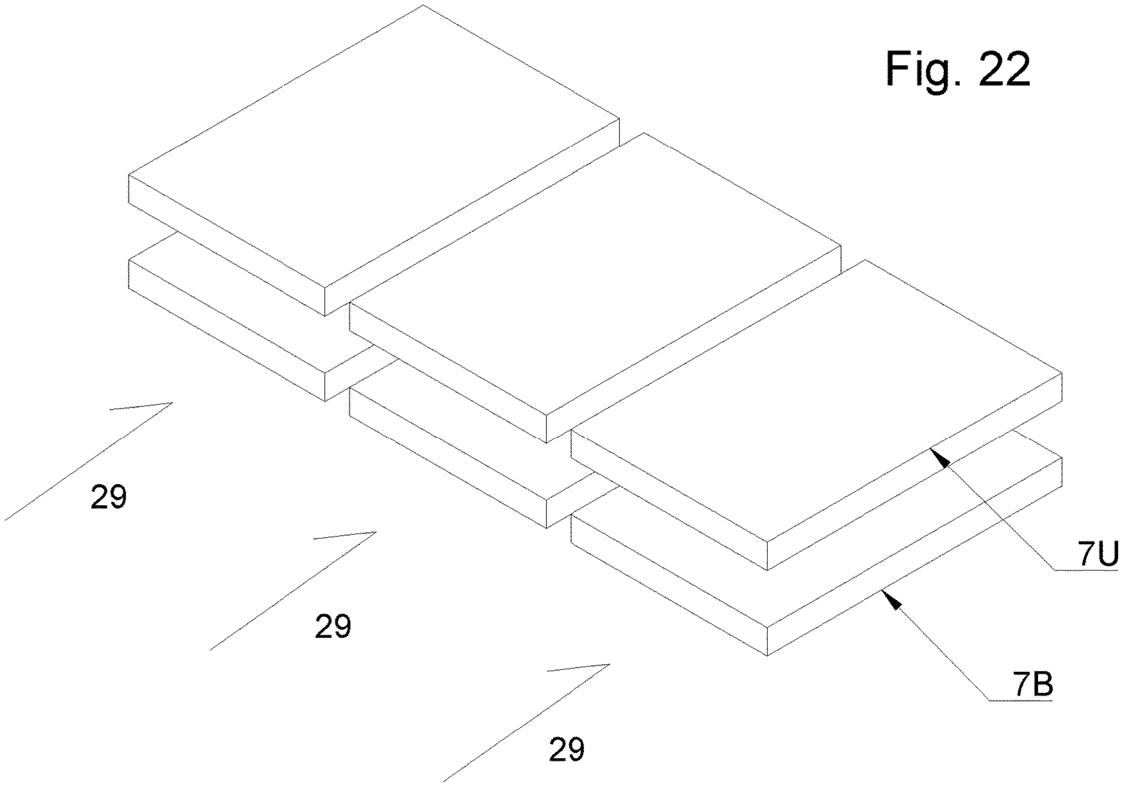

FIG. 22 is a perspective drawing of the magnets in the arrangement when installed in the magnet cavities of the preferred embodiment.

Figure 23:
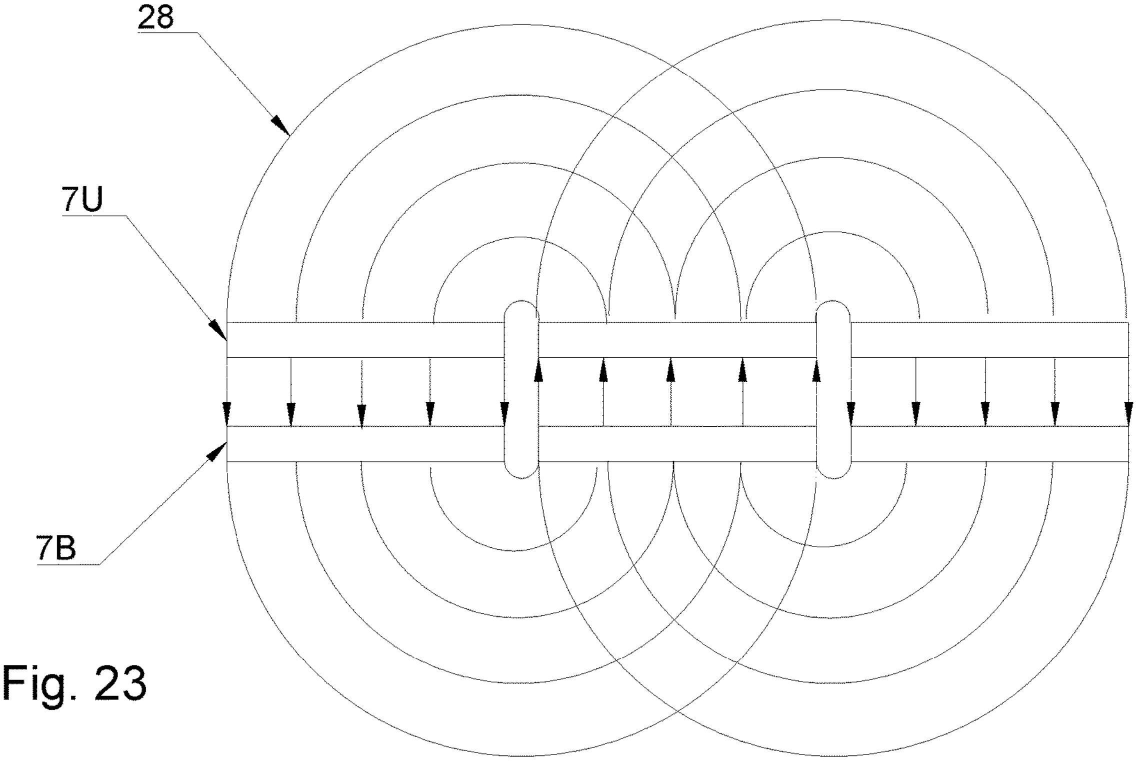

FIG. 23 is a diagram showing the magnetic field lines between the magnets of the preferred embodiment of the magnet configuration in FIG. 22. In the preferred embodiment these field lines pass through the hydrofoils of the invention and produce the magnetic field used to produce a Lorentz force on the charges.

Figure 24:
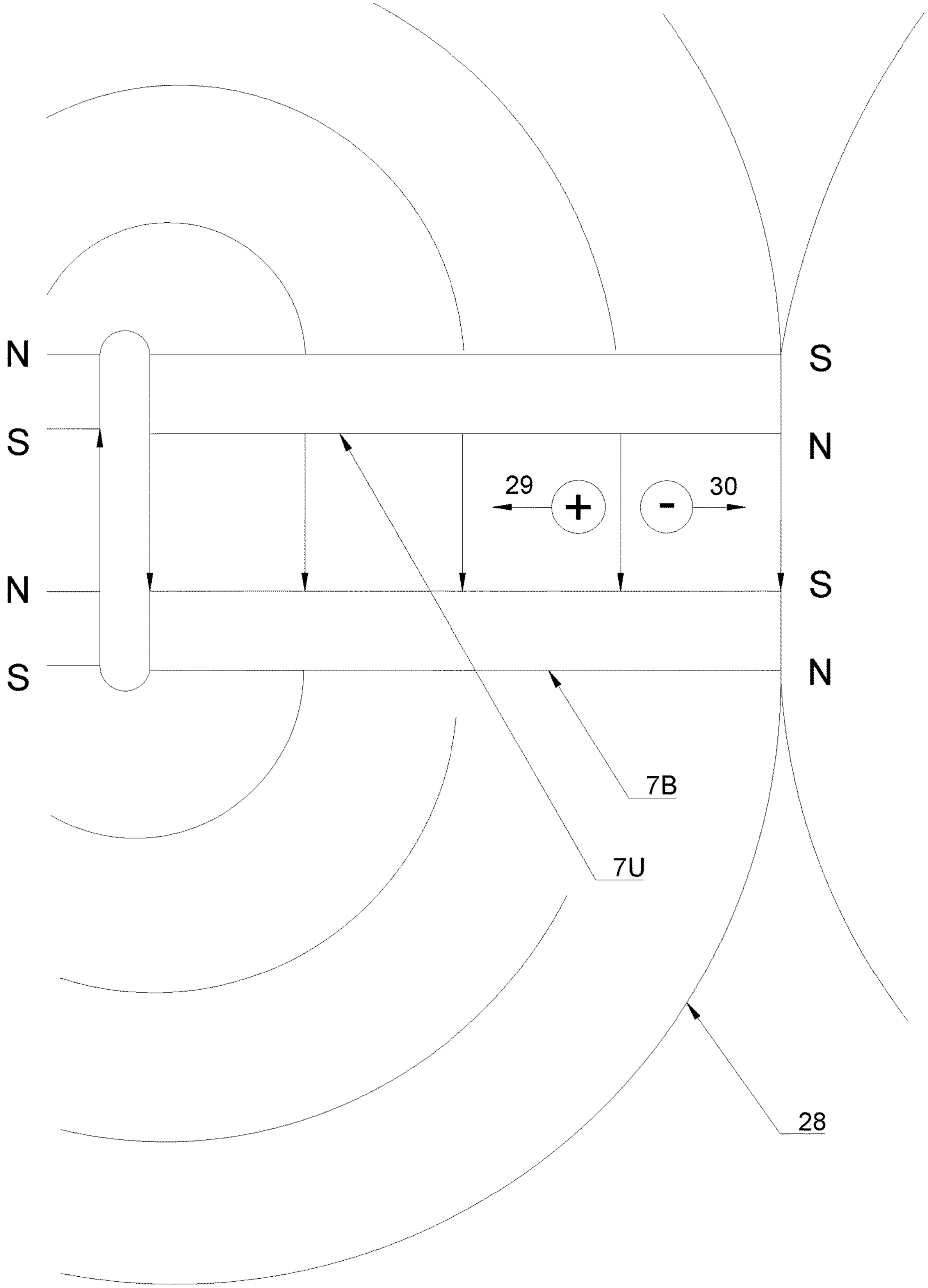

FIG. 24 is a close up diagrammatic front view of one of the magnet combinations of FIG. 23 (middle and furthest magnet pair are cut off the page) with arrows indicating the direction of the magnetic field between the magnets as well as north (N) and south (S) pole identifications for each magnet. Also present in this image is two ions/charges showing with a flow into the page, showing the force that the charge has exerted on it from the Lorentz force.

Figure 1:
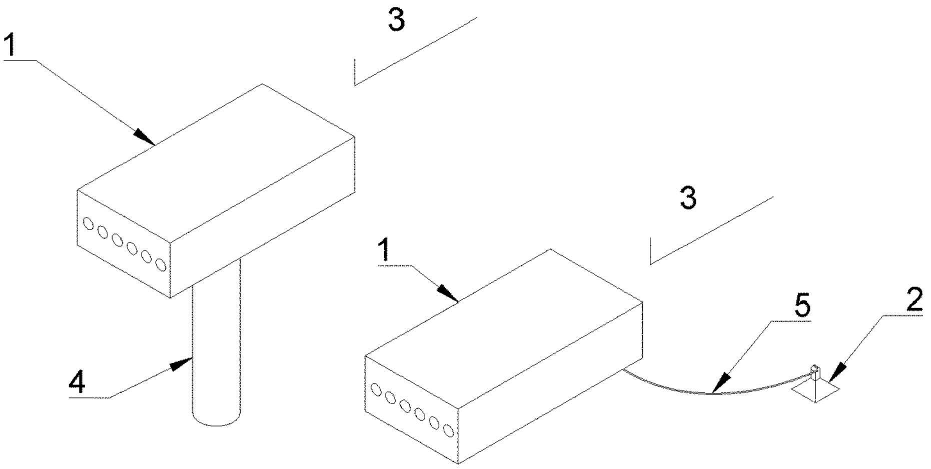
FIG. 1 is a perspective view of two types of configurations installation of the energy generation system of the present invention. One version is fixed mounted system similar to traditional wind turbine, and the second is a buoyancy compensated kite style of implementation.
Figure 25:
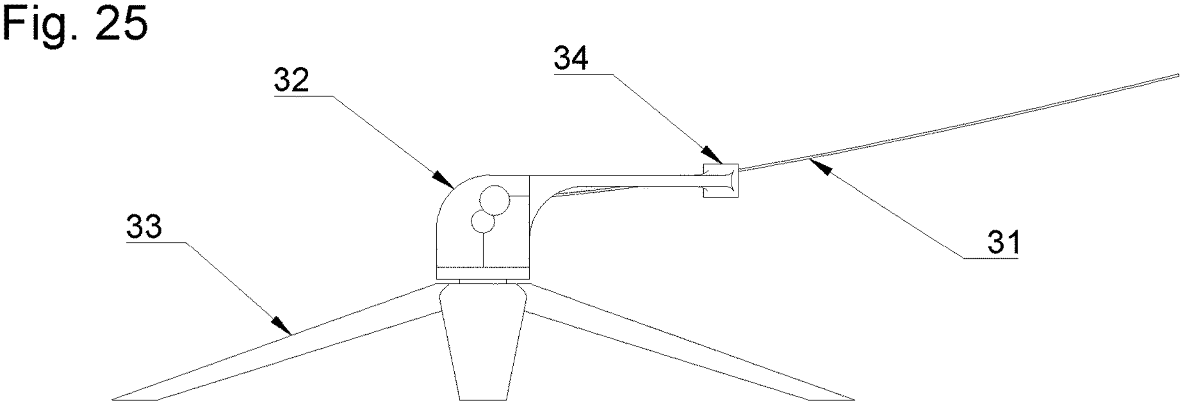

FIG. 25 is a side view of the base anchoring system shown in FIG. 1 for use with kite style buoyancy compensated version.

Figure 26:
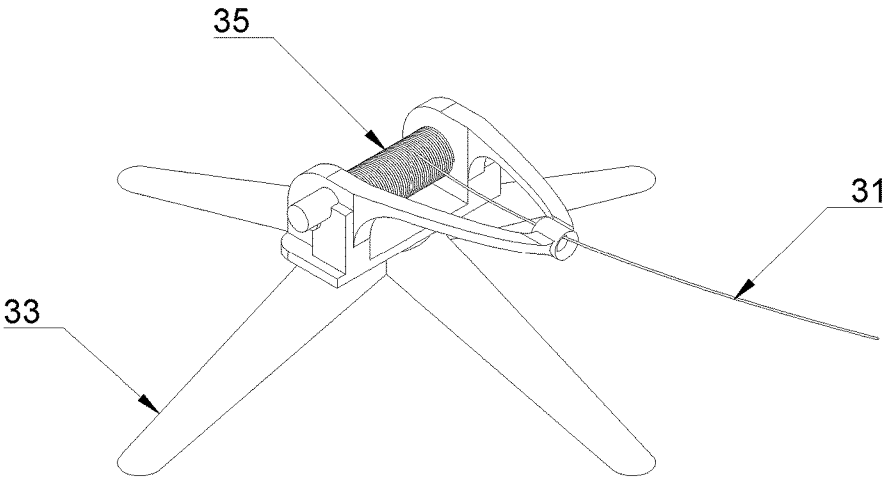

FIG. 26 is a perspective view of the anchoring system of FIG. 25.

Figure 27:
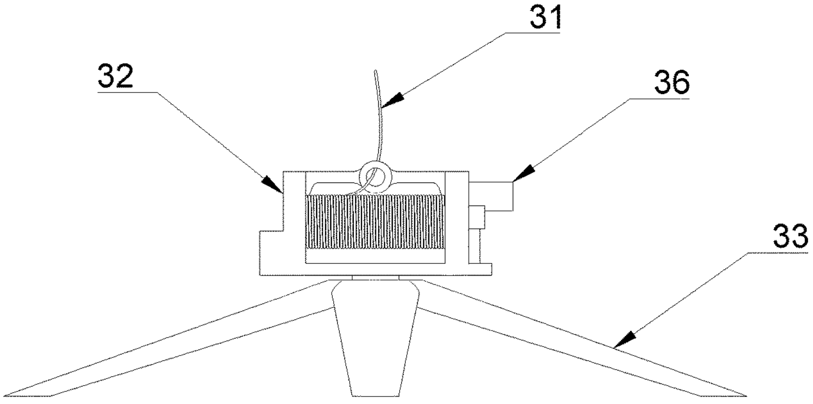

FIG. 27 is a front view of the anchoring system of FIG. 25.

DETAILED DESCRIPTION OF THE INVENTION

The preferred embodiment of the present invention is implemented in a fluid environment having a movement of ions, preferrably a saltwater ocean or sea having a consistent or constant current of the environment's water. Saltwater such as that normally found in oceans, seas or brackish waters, but can also be found in locations of tidal inflow and outflow, as well estuaries. Ions present within the saltwater can have various chemical compositions, but for brevity they will be generally described in this description as either having a positive, negative or neutral charge. The detailed description will identify and explain functions of elements found in the figures.

FIG. 1 shows two Bladeless Underwater Energy Generators (1) in a first form mounted on a tower (4) similar to a wind turbine. The tower can be implemented at any height to place the intakes of the bladeless generators at the maximum fluid current (3) zone. The tower would also permit the interior installation of electrical wiring or other components needed for function of the bladeless generator.

The second form of the bladeless generator (1) is implemented by an anchor system (2) and a retention/umbilical line (5) for use with an onboard buoyancy system. The bladeless generator (1) would contain a bladder or ballast system able to be pumped with a gas, or filled with a liquid such as the surrounding water or other separately stored liquid such as freshwater, hydraulic fluid or oil to cause the bladeless generator to rise or lower in the water column. For example separate gas storage tanks (not shown) could be connected to the anchor system to pump the gas through the umbilical line into a bladder on the bladeless generator to cause it to rise higher in the water column. Benefits of using a buoyancy system include wide ranging depths of implementing the bladeless generator, as well as more convenient ways of raising the bladeless generator to the water surface for general maintenance and cleaning.

Figure 4:
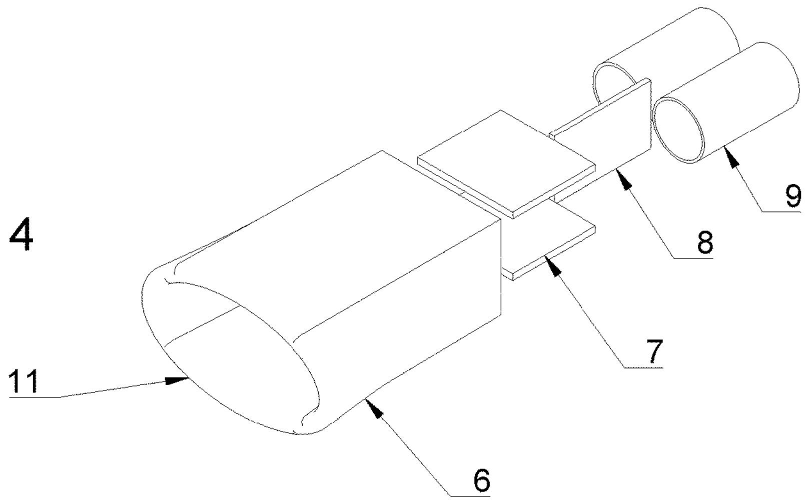
FIG. 4 is a perspective view of the present invention showing the components related to the main functional components including the fluid intake, magnets, stream divider and cylindrical electrodes.
Figure 5:
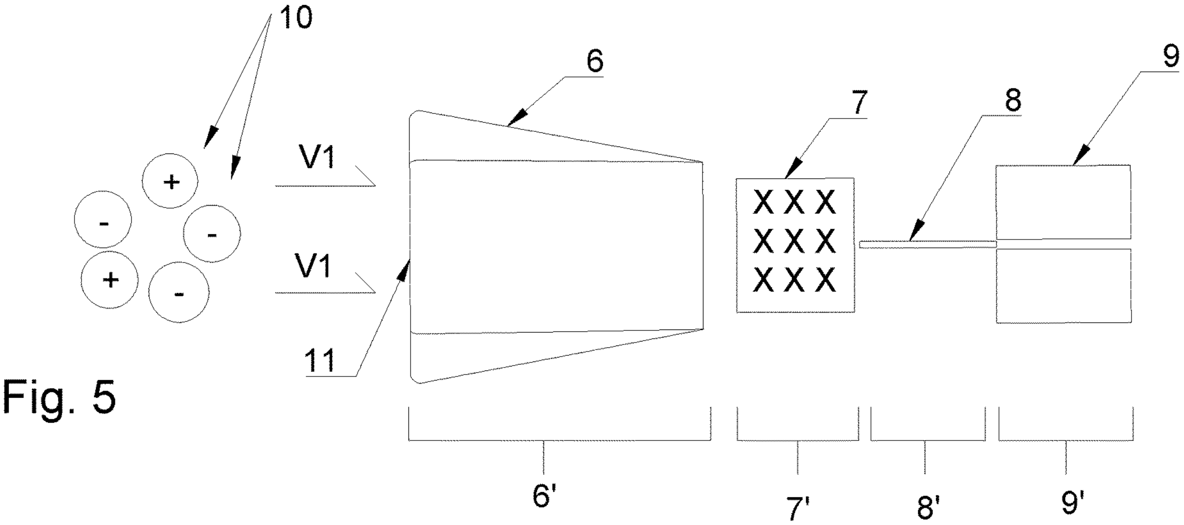
FIG. 5 is a top view of FIG. 4 indicating the flow of ions present in a flow as well as the direction of the magnetic field present between the magnets.
Figure 6:
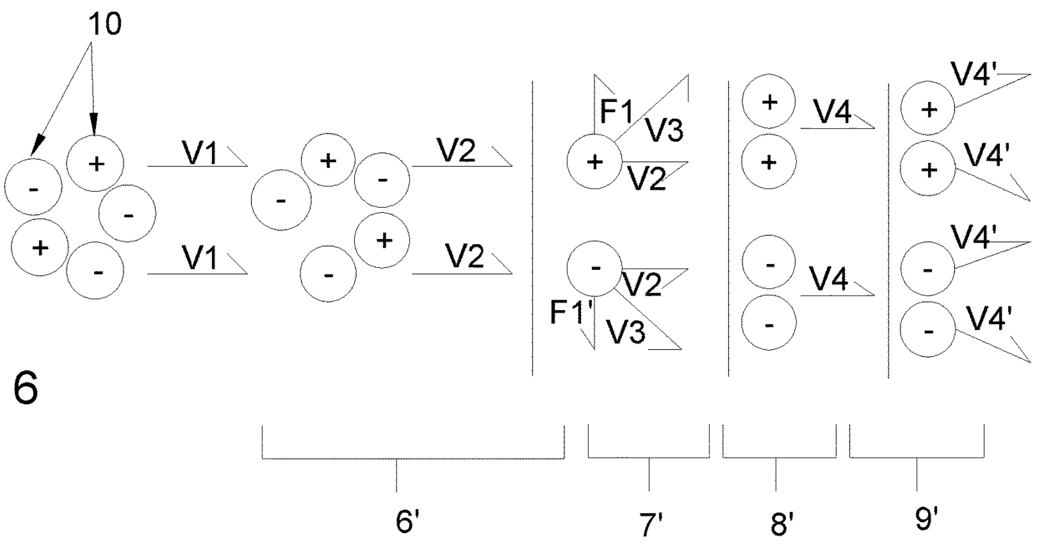
FIG. 6 is a diagrammatic drawing of the functional movement of the charges in the fluid stream, with arrows indicating components of force, velocity and vector velocities.

FIGS. 4-6 functionally diagram the general design and theory to the bladeless generator. FIGS. 4-5 contains a first intake section (6) having an inlet (11) where fluid containing charged ions (10) enters the bladeless generator in the intake/stream zone (6') at an initial velocity V1. Two magnets (7) are arranged in between the inlet and the stream divider (8) in the divided sub-stream zone (8'). Magnets (7) are generally permanent magnets, arrays of magnets, electromagnets or any other way to create a substantially uniform magnetic field between the top and bottom magnetic plate. The divider (8) is used to maintain the separation of the two streams after fluid has traversed the separation zone. The volume between the magnets is generally referred to as the separation zone (7'). It is envisioned that the divider can be directly in front of the electrodes (9) or combined with the electrodes section in the electrode zone (9').

The electrodes (9) have a cylindrical shape and are generally constructed of a material that is metallic, carbon containing, a combination of metal and carbon materials, or any other composite or material that has the properties of conduction. While the electrodes of embodiments are described and drawn as being cylindrical, the shape of the electrode could have any cross-sectional shape desired so long as fluid flow therethrough is possible, for example the cross sectional shape of the electrode could be square, or the electrode may be a center line electrode located along a center flow axis of a sub-stream. The electrodes are preferably constructed such that they are corrosion resistant to saltwater. Corrosion resistant materials can vary from carbon based electrodes where the electrode itself is constructed of a carbon based material either partially or completely. A partially carbon based electrode can be implemented as a composite metal and carbon material, or a carbon coated metal. Carbon materials for use with the electrode include but are not limited to carbon nanotubes, graphene, carbon black or graphite. Metals for use in the construction of the electrode include but not limited to copper, gold, zinc, silver, brass, steel. It is further envisioned that the interior surface of the electrodes can be smooth, grooved, patterned or shaped. Smooth surfaces offer the greatest amount of fluid velocity, but other surface patterns may be useful to encourage braking or slowing of the fluid near the surface area so that conduction of charges has a higher probability of occurring. Grooves in the interior of the cylindrical electrode surface can be in the form of length wise grooves, helical grooves or concentric grooves along the interior of the electrode around the cylindrical axis. Other surface shapes also include surface relief patterns, nanopatterns comprising nanostructures, or micropatterns consisting of microstructures.

FIG. 6 is a functional diagram of the staged zone movement of the ions in the fluid stream as it travels along the bladeless generator. Ions can be Sodium, Chloride, Magnesium or Calcium but are not limited to listed elements and can even include free charges such as electrons and protons. Charged ions (10) containing positive and negative charges are initially flowing at a velocity V1 outside the bladeless generator. V1 can be the velocity of an ocean current, velocity of fluid as passes a ship, vessel or other watercraft, or can be fluid movement caused by tides, but in any case V1 represents the velocity of the fluid before entering the bladeless generator. As the fluid nears the bladeless generator fluid movement may increase or decrease depending on intake design, and will eventually attain a second velocity V2 during movement through the intake zone (6'). As the stream of fluid enters the separation zone (7') with velocity V2, a Lorentz force F1 (or F1') is exerted on the moving charges causing a new velocity V3 of particular ions in the stream. The particular ions are one of positive or negative, but also contained in the fluid stream are neutral elements or compounds having no charge (neutral). In FIGS. 4-6, positive ions are represented by a circle having a plus sign (+) within the circle, and negative ions are represented by a circle with a minus sign (−) within the circle. For clarity of the diagram, the atoms, molecules or other compounds having a neutral charge are not shown but are present in the stream as well.

In FIG. 5, the magnetic field direction in separation zone (7') is into the page of the drawing as represented by nine X's. In accordance with the Lorentz force equation, as positive charges traveling in the direction V2 enter the separation zone having a magnetic field into the page as described in FIG. 5, the positive ion will experience a force F1 towards the top of the page. Conversely, when a negative ion enters the same separation zone it will experience a force F1' in the opposite direction of the positive ion. These opposite direction forces combined with the stream velocity cause separation of different charge ions into two sub-streams having velocity V4. As the sub-streams continue to flow, the repulsive forces between similarly charged ions will become more frequent due to the increased concentration of similar charge sign in the sub-stream. As repulsive forces separate same sign charges in the sub-streams new velocities V4' generally in opposite directions will occur, as well as other similar velocities generally in the same direction as the sub-stream as it travel through and exits the electrode in the electrode zone (9').

FIGS. 7-9 are functional diagrams of ion and charge movement in the cylindrical electrodes occurring in the electrode zone (9') viewed from the front of the bladeless generator with the sub-stream direction of movement into the page. Electrodes (9) are connected by appropriate electrically conductive materials (12') to electronics (12). Conductive materials (12') can be materials such as wires, conductive structures other than wires or can be printed fused conductive particles. Electronics (12) is any form of electronics that can use or store the electrical current and potential created between the two electrodes (9). Electronics (12) include for example a load or an electrical connection to a utility grid through the umbilical (5) or through the tower (4), a battery, a fuel cell or other electrical power systems for uses not connected a utility grid. FIG. 7 is the initial state of charge distribution along the conductive material (12') where electrons are generally evenly distributed between the two electrodes, and sub-streams of separated ions are about to enter electrode interior indicating no flow of charges through electronics (12) as indicated by zero voltage P0. FIG. 8 is another state where charges are spreading to the electrode surface from mutual repulsion, but also from general flow through electrode or electrode surface grooves, patterns or shapes. In FIG. 8, negative charges (electrons) along conductive material are biased to move from the right electrode to the left electrode due to ion distributions in the sub-streams, and a potential P1 is measured between the electrodes which is more than P0. In FIG. 9 sub-streams containing more similarly charged ions continue to flow through the electrodes causing increased voltage between the electrodes P2. As sub-streams continue to flow, at least some electrons are released from the left electrode into the positive sub-stream (arrow EA), and at least some of electrons are absorbed from negative sub-stream onto the right electrode (arrow ER). It is also envisioned that an electron source may be used in addition to the sub-stream contacting the right electrode, such as an earth connection or grounding connected between the electrodes or to the right electrode. The continued flow of sub-streams allows for electrons pulled into one sub-stream from the left electrode to be replaced by electrons pulled onto the right electrode creating a continuous current flow (13).

FIGS. 10-12 are diagrams of a preferred embodiment of the Bladeless Underwater Energy Generator, having three bladeless generators (BG1, BG2, BG3) as well as a hydrofoil intake system. Each of the three bladeless generators in FIGS. 10-12 work similar to the bladeless generator described in FIGS. 4-9 but additionally have a hydrofoil based intake system to modify flow velocities of the ion stream entering the separation zone. Each bladeless generator of FIG. 10 has a dual hydrofoil system composed of upper and lower foils (15). It is also envisioned that hydrofoil systems may contain only one foil (15), or some form of combination between an intake system (6) and a foil (15). Also present in FIG. 10 are preferred embodiment bladeless generator dividers (16), dividers (17), and electrode housings (14) which contain the electrodes similar to those described in FIGS. 4-9. Also viewable in FIG. 10 but not identified is the foil angle of attack control system. In FIG. 11, foil adjustment attachments (18) are connected through foils (15) to increase or decrease the angle of attack of the foils in the fluid stream.

FIG. 12 is one embodiment of Angle of Attack Adjustment System (AAAS) containing foil adjustment attachments (18), attachment control rods (19), yoke (20), actuation control rod (21) and actuation system (22). Also present in FIG. 12 are foil pivot rod locations (25) which allow the foil to pivot about these points under the control of the AAAS. Suitable actuation systems include sealed hydraulic pistons, linear actuator, linear motors or any electronically controlled system capable of creating a force to move the actuation control rod forward and backward adjusting the angle of attack of the foils. During actuation, the actuation system (22) pushes forward on the actuation control rod (21) toward the front of the bladeless generator. This forward movement of actuation control rod (21) causes yoke (20) to pull down on the upper attachment control rod (19) connected to the upper foil, and pull upward on the lower attachment control rod (19) connected to the lower foil. This forward movement causes the portion of the upper foil near the trailing edge to pull inward (downward) toward the ion stream, simultaneously pulling inward (upward) on the lower foil. Conversely, reverse movement of the actuation system (22) pulls the actuation control rod (21) toward the rear of the bladeless generator, following the same basic motions of forward motion in reverse. When the actuation system (22) pulls the actuation control rod (21) the upper and lower foils move in opposite directions as to that described in forward pushing of the control rod (21). It is also envisioned that any number of suitable methods to control the angle of attack of the foils are possible including direct actuation by stepper motors, hydraulic pistons, larger servo motors as well as appropriate gearing or transmission components.

As the angle of attack of the foils varies, the velocity of the fluid over the upper surfaces of foils (see FIG. 17 and FIG. 18, elements 15' for upper surface location), will increase or decrease depending on whether the angle of attack of the foil is increased or decreased. For example, if the angle of attack is increased for each foil respectively, the fluid velocity over the upper surfaces (15') of the foils will increase leading to a higher Lorentz force exerted on each ion in the stream. This adjustment of the stream velocity is used to increase or decrease the velocity of the stream through the separation zone (7') to either accommodate changes in fluid velocity entering the bladeless generator or control output power based on demands or desired generation. For example, if the fluid velocity V1 outside the bladeless generator decreases, the angle of attack of the foils can be increased to accommodate this reduction in velocity V1 to maintain separation zone velocity V2.

In FIGS. 13-15 electrode housing exhaust ports (23) as visible, as well as bladeless generator divider cutouts (24). Exhaust ports indicate the locations in the electrode housing where flow of sub-streams exits the bladeless generator, and bladeless generator divider cutouts accommodate a section of the foils used by the AAAS which is connected to the foil adjustment attachments (18). While the range of motion of the foil due to cutout in FIGS. 13 and 15 is small, it is envisioned that the range of angles possible by the foils may be larger or smaller based on desired characteristics combined with suitable sizes of cutouts.

FIGS. 16-18 are the same embodiment of bladeless generators from FIGS. 10-15 shown without bladeless generator dividers. Visible in FIGS. 16-18 are fluid inlet area (26), magnet cavities (28) located inside both foils (15). The orientation of magnets (7) which are installed within the cavities (28) are arranged in a manner such that a substantially uniform magnetic field is created in the magnetic separation field zone (27) corresponding to separation zone (7') in FIGS. 5-6. Magnets (7) installed in magnet cavities (28) as have an alternating arrangement (further explained in FIGS. 22-24) so that external magnetic fields from one bladeless generator magnet supplement adjacent bladeless generator magnetic fields. FIG. 17 shows the AAAS in relation to the upper surface locations (15') on each foil (15) of the bladeless generator hydrofoil, as well as the electrode housing (14). It should be noted that while the preferred embodiment of the invention indicates a particular shape of the foil, the disclosure is not meant to be limited by this design. It is envisioned that the shape of the foil could be different from that indicated in the drawings. Also visible is divider (17) which has a narrowing shape to accommodate the foils of the current embodiment. The gap between the upper surface of each foil in the preferred embodiment is shown in the drawings relatively thin in comparison to the other components including the foil, but in all embodiments it is possible for the gap to be any size in order to maximize fluid flow within the region, or controllability of the flow velocity.

FIGS. 19-21 are views of the previous embodiment having all components of the hydrofoil bladeless generator not shown except for the electrode housing (14) and dividers (17) and the locations of cylindrical electrodes (9). It is preferred that internal surfaces of the electrode housings are smooth to maximize laminar flow from the separation zone to the electrodes. The shape of dividers (17) in FIG. 19 and FIG. 21 are shown as a generally tapered shape having a contour similar to the foil upper surface, however it is envisioned that this shape could be any shape desired such sub-streams after the separation zone are maintained.

FIG. 22 is a perspective diagram showing only the three sets of magnets of preferred embodiment bladeless generator. Each row of magnets is labeled either 7U for the upper row of magnets, and 7B for the bottom row of magnets. The fluid flow direction of the ion containing fluid is identified by arrow 29. Fluid flow (29) illustrates the stream direction between the foils before or upon entering the bladeless generator. Not visible in FIG. 22 but visible in FIG. 23 are magnetic field lines. In FIG. 23 magnetic field lines are drawn for illustrative purposes only to demonstrate field recycling, and do not differentiate based on magnetic field strength, density or flux. FIG. 23 is a view of the magnets of FIG. 22 seen from the front of the preferred embodiment bladeless generator, the view being generally from the same direction as the flow arrows (29). The field lines are drawn so that the lines enter the magnet through the south pole and exit through the north pole (see FIG. 24 for pole identifications). Following the pole convention in the previous sentence, and identifying the magnet sets of FIG. 23 from left to right the orientation of the magnetic poles of both magnets 7U and 7B would be first set north facing downward, second set north facing upward, third set north facing downward. This alternating pattern of the orientation allows magnetic field from the adjacent sets to combine with the field within the separation zone of adjacent magnet sets. This alternating arrangement also allows for a tight formation of multiple bladeless generators to improve scaling of smaller form systems. In further embodiments it is envisioned that there can be greater than three horizontally combined bladeless generators, and could have any number desired for particular application. For example, it is possible that a form of the device is constructed whereby hundreds of bladeless generators are strung together to create a generally linear arrangement. Further it is possible to vertically stack sets of bladeless generators, for example when used on a tower, several bladeless generators could be stacked to increase the area of the flow capture area.

In FIG. 24 the motion of an ion present between the magnets of the third set of magnets as the flow of ions flows in the separation zone stream in a direction into the page is shown. The motions are generally depicted as positive motion (29) and negative ion motion (30). Because of the perspective no differentiation between force or velocity is made for brevity and thus for purposes of this drawing it is generally described that the particular ion identified will move in the direction identified only. The magnetic field lines (28) between the third set of magnets is the focus of FIG. 24. Visible also in FIG. 24 are the polar orientations of the magnets as indicated by a N for the north pole side of the magnet and a S for the south pole of the magnet. As charge ions of the fluid stream enter the volume between the magnets 7U and 7B of FIG. 24, the ions encounter a downward facing substantially uniform magnetic field. As the charges flow in the direction that is into the page, the positive charge will have a force exerted on it in the leftward direction causing motion in the left direction as the charge continues along its original flow direction into the page and subsequently in a left side sub-stream. For the negative charge the general same motions will occur except that the ion will move in the rightward direction because of sign of the charge and subsequently in a left side sub-stream. It should be noted that ions are not drawn to scale, and are sized for visualization purposes only.

FIGS. 25-27 are one embodiment of a preferred anchor system having an umbilical (31), frame for the umbilical winding (32), anchoring leg (33), umbilical director (34) and the umbilical reel (35). The anchoring system has a motor for winding or unwinding the umbilical which can also contain other fluid lines for gases such as air, nitrogen or other buoyancy fluid. The anchoring system can contain a pump to move the gases from the anchoring system to the bladeless generator to control buoyancy when using a buoyancy based bladeless generator system of FIG. 1. The umbilical also contains electrical lines both for conducting electrical power to external power systems, but also for control of the winding and unwinding of the umbilical reel (35) to adjust the depth of the bladeless generator in the water column.

Appropriate electronics onboard the bladeless generator include a controller implemented by a microprocessor, a storage medium implemented by a solid-state memory, hard disk, or other computer memory type to store instructions for reading by the processor. User interface connections which can be wireless or wired through a separate line, The instructions control the actuation of the AAAS to move the foils when required, adjust depth by reel/buoyancy control. The control electronics can also measure current or voltage through the electronics (12), which measurements can be used by the controller to make adjustments to the angle of attach of the foils in real time, adjust the buoyancy of the bladeless generator, and adjust the depth of the bladeless generator in the water column.

Figure 2:
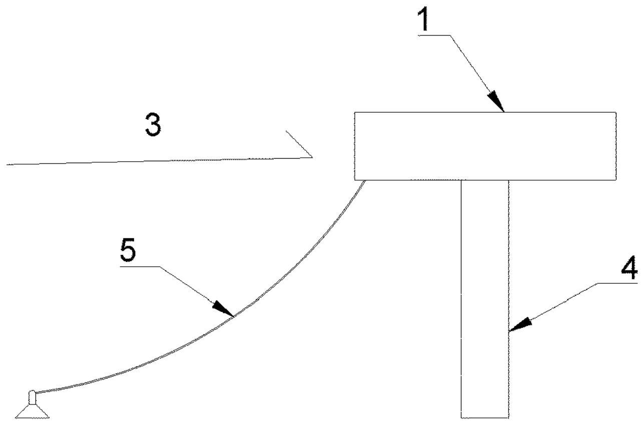
FIG. 2 is a side view of the perspective drawing of FIG. 1.
Figure 3:
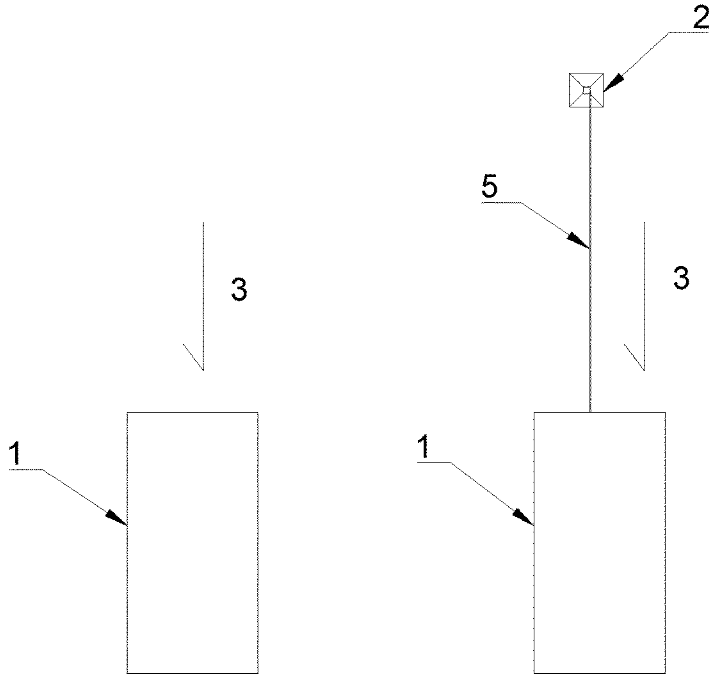
FIG. 3 is view from above of FIG. 1.

In operation of the preferred embodiment bladeless generator is installed in a location of oceanic environment experiencing ocean current flow, for example the Gulf stream, using either of the systems diagrammed in FIGS. 1-3 to hold the bladeless generator steady in the ocean current with its inlet facing the oncoming flow of ocean water. As Ions present in the current pass the separation zone, positive and negative ions in the stream move to divided sub-streams in the bladeless generator. Electrodes then uptake or release electrons into the different sub-streams depending sub-stream charge sign. A voltage or electrical current is generated between the electrodes through the electronics which can be used to power external devices, connect to a utility grid or can be stored in batteries. As the controller reads the current flowing through the electronics system, the controller sends signals to the hydrofoil actuation systems to adjust the angle of attack of the foils to increase or decrease the velocity of the fluid through the separation zone. This process of real time current and voltage monitoring by the controller combined with control of fluid velocity by the foils creates a feedback loop to control the power output of the bladeless generator. It is also envisioned that while the current embodiment uses current and voltage measurements from the electronics, measurement systems can include sensors such as voltage sensors and current sensors. After passing the electrodes of the bladeless generators, the sub-streams exit the electrode housing back into the ocean environment.

Advantages of the Bladeless Underwater Electricity Generator provide several improvements over conventional mechanical energy generators. First, there are no moving parts involved in the generation of electricity except the periodic adjustment of the foils. There is no mechanical movement of rotor blades as with wind turbines and thus no threat of harm or damage to sea life. Because of the bladeless generator does not convert mechanical work into electricity, structural integrity is more flexible. While there is expected to be a significant attractive force between the magnets of the bladeless generator requiring high strength materials, this is generally the only high stress point of the bladeless generator, most of the remainder of the housing and dividers can be more easily constructed with various materials. Implementations of the bladeless generator are implemented underwater and therefore out of view of the public, boats or coast lines.

To the extent this Invention description and drawings disclose more subject matter than what is claimed in the single claim written below, that subject matter is not dedicated to the public, and the right to claim that invention in a subsequent application is reserved. Though the claims presented here are narrow, it should be noted that the scope of the invention here is broader than what is claimed. It is intended that any future applications claiming priority from this application may have broader claims submitted.

What is claimed is:

1. An Underwater Electricity Generator apparatus comprising: a fluid that contains ions, at least one first magnet, at least one first electrode and second electrode, a dynamic fluid flow control mechanism comprising two opposed foils and a static hydrodynamic splitting surface located in between at least a portion of each of the opposed foils, wherein the fluid that contains ions enters an at least one inlet as a single stream and is divided into at least two physically separated sub-stream portions after flow of the fluid through the magnetic field of the first magnet. the static hydrodynamic splitting surface being downstream of the magnetic field and maintaining the at least two physically separated sub-stream portions, such that at least a first sub-stream contacts only the first electrode, and at least a second sub-stream contacts only the second electrode thereby producing at least one of a voltage or an electrical current between the first and second electrode.

2. The Underwater Electricity Generator apparatus of claim 1, further comprising an inlet, the static hydrodynamic splitting surface defining the at least two physically separated sub-stream portions, a controller and an electrode housing, wherein the static hydrodynamic splitting surface and electrode housing are downstream of the inlet.

3. The Underwater Electricity Generator apparatus of claim 2, further comprising at least a second magnet, wherein the first magnet and the second magnet additively combine magnetic fields such that a substantially uniform magnetic field is attained between the magnets, the substantially uniform magnetic field exerting a Lorentz force on ions within the fluid.

4. The Underwater Electricity Generator apparatus of claim 3, further comprising, wherein the first magnet and the second magnet are positioned on opposite sides of the fluid containing ions, and the velocity of the fluid containing ions is dynamically controlled to maintain a pre-determined voltage or current output.

5. The Underwater Electricity Generator apparatus of claim 3, further comprising, wherein the pair of opposed foils each have a suction surface and a pressure surface, the surface normal of each foil suction surface and pressure surface being substantially perpendicular to the surface normal of each side of the static hydrodynamic splitting surface, wherein each foil comprises a cavity.

6. The Underwater Electricity Generator apparatus of claim 5, further comprising, wherein the first and second magnets are installed in a cavity of each foil.

7. The Underwater Electricity Generator apparatus of claim 6, further comprising, wherein the first electrode and second electrode define electrode cylinders, each of the first electrode and second electrode allowing one of the physically separated sub-stream portions to flow therethrough, and the first and second electrodes are electrically connected.

8. The Underwater Electricity Generator apparatus of claim 7, further comprising at least one of a voltage sensor or a current sensor configured to measure the voltage or electrical current generated between the first and second electrodes, wherein the measurements are used by a controller to generate signals used to control a fluid velocity between the foils.

9. The Underwater Electricity Generator apparatus of claim 8, further comprising a foil actuation system, wherein the dynamic fluid flow control mechanism can adjust the angle of attack of at least one of the foils based on the signals generated by the controller.

10. The Bladeless Underwater Electricity Generator apparatus of claim 9, further comprising, wherein the angle of attack of the foil modifies the velocity of the fluid through the substantially uniform magnetic field so that the Lorentz force exerted on ions in the fluid is modified in real time based on the measurements.

11. The Underwater Electricity Generator apparatus of claim 10, further comprising at least one of: a tower mount system, wherein the generator apparatus is mounted at the upper most location; or an anchor and umbilical, wherein the generator apparatus further comprises a buoyancy system to maintain the generator apparatus at a desired depth and the anchor further comprises a reel for the umbilical.

12. An underwater electricity generator, comprising a plurality of paired magnets, wherein a substantially uniform magnetic field axis is formed between at least two magnets of each pair of magnets, wherein the magnetic field vector between each pair of magnets is substantially antiparallel with the next closest adjacent pair of magnets, a plurality of paired cylindrical electrodes, each pair of cylindrical electrodes downstream of each pair of magnets, wherein the pairs of cylindrical electrodes are arranged to receive respective physically separated sub-stream portions of a single fluid stream containing ions, each sub-stream portion contacting only the interior of one of the cylindrical electrodes after passing the pair of magnets, wherein a voltage or current is formed by the underwater electricity generator between each pair of cylindrical electrodes.

13. The underwater electricity generator of claim 12, further comprising wherein the plurality paired magnets contains at least a first and second pair of magnets, each pair of magnets defining an internal magnetic field located between each magnet of the pair, and an external magnetic field defined by any of the magnetic field emitted from pair but not located between pair of magnets, the first pair of magnets arranged so that the external magnetic field from the first pair of magnets is substantially parallel and overlapping with the internal magnetic field of the second pair of magnets and antiparallel with the internal magnetic field of the first pair of magnets.

14. The underwater electricity generator of claim 12, wherein the voltage or current formed by the underwater electricity generator is measured by a controller, wherein the controller uses the measured voltage or current to control an angle of attack of a pair of movable foils to increase a gap between the suction surfaces of the pair of movable foils.

15. The underwater electricity generator of claim 14, wherein the fluid velocity control system comprises a hydrofoil, wherein at least one magnet of each pair of magnets is installed in each movable foil of the pair of movable foils creating a substantially uniform magnetic field between the suction surfaces of movable foils.

16. The Underwater Electricity Generator apparatus of claim 3, further comprising: wherein the first electrode is a cylindrical electrode that radially encircles one of the sub-streams, and wherein the radially interior surface of the first electrode is exposed to the flowing fluid in the physically separated sub-stream portion, and the radially exterior surface of the first electrode is not exposed to the fluid or the sub-stream.

17. A method of generating electricity using an Underwater Electricity Generator, the method comprising: a first step of placing an underwater electricity generator in a single fluid stream containing ions, wherein a second step divides the fluid stream into two sub-streams having a net charge difference between the sub-streams after passage of the fluid stream through a magnetic field, and maintains the net charge difference by adjusting a foil.

18. The method of generating electricity using an Underwater Electricity Generator according to claim 17, further comprising: wherein the second step divides the fluid stream by the movement of the ions in between two substantially parallel magnets.

19. The method of generating electricity using an Underwater Electricity Generator according to claim 18, further comprising: a third step of measuring the net charge difference between the sub-streams and utilizing a measurement from at least one of a voltage sensor or a current sensor by a controller to adjust the angle of attack of the foil.

20. The method of generating electricity using an Underwater Electricity Generator according to claim 19, further comprising: a fourth step wherein an amount of voltage or current is extracted from the net charge difference to enable usable energy generation.

21. The method of generating electricity using an Underwater Electricity Generator according to claim 19, further comprising: a fourth step wherein the angle of attack is based on real time voltage or current measurements providing dynamic control over the foil.

* * * * *